United States Patent
Griesmeier et al.

(10) Patent No.: US 11,619,299 B2
(45) Date of Patent: Apr. 4, 2023

(54) METHOD FOR OPERATING A HYBRID TRANSMISSION

(71) Applicant: ZF Friedrichshafen AG, Friedrichshafen (DE)

(72) Inventors: Uwe Griesmeier, Markdorf (DE); Johannes Kaltenbach, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 285 days.

(21) Appl. No.: 16/764,196

(22) PCT Filed: Oct. 16, 2018

(86) PCT No.: PCT/EP2018/078268
§ 371 (c)(1),
(2) Date: May 14, 2020

(87) PCT Pub. No.: WO2019/096519
PCT Pub. Date: May 23, 2019

(65) Prior Publication Data
US 2020/0292070 A1    Sep. 17, 2020

(30) Foreign Application Priority Data
Nov. 15, 2017   (DE) ............. 10 2017 220 392.7

(51) Int. Cl.
*F16H 61/16* (2006.01)
*F16H 59/60* (2006.01)
(Continued)

(52) U.S. Cl.
CPC .............. *F16H 61/16* (2013.01); *F16H 3/08* (2013.01); *F16H 59/60* (2013.01);
(Continued)

(58) Field of Classification Search
CPC .. F16H 61/16; F16H 59/60; F16H 2003/0818; F16H 2059/666
(Continued)

(56) References Cited

U.S. PATENT DOCUMENTS 6,645,105 B2 * 11/2003 Kima .................. B60K 6/38
903/910
9,478,136 B2   10/2016 Lehner et al.
(Continued)

FOREIGN PATENT DOCUMENTS

DE    102007002842 A1    11/2007
DE    102010063582 A1    6/2012
(Continued)

OTHER PUBLICATIONS

International Search Report (English Translation) PCT/EP2018/078268, dated Feb. 6, 2019. (3 pages).
(Continued)

*Primary Examiner* — Ha Dinh Ho
(74) *Attorney, Agent, or Firm* — Dority & Manning, P.A.

(57) ABSTRACT

A method for operating a hybrid transmission includes monitoring the surroundings of a motor vehicle and, based on the data ascertained within the scope of the monitoring, determining a probability of occurrence of a driving situation to be anticipated, which, upon occurring, results in a deceleration of the motor vehicle. Based on the determined probability of occurrence, it is decided whether to carry out an electrodynamic gear shift or an output-assisted gear shift in order to transfer the hybrid transmission out of an operating condition, in which a gear is engaged, into a shift condition.

18 Claims, 2 Drawing Sheets

(51) Int. Cl.
*F16H 3/08* (2006.01)
*F16H 59/66* (2006.01)

(52) U.S. Cl.
CPC ............... *F16H 2003/0818* (2013.01); *F16H 2059/666* (2013.01); *F16H 2061/168* (2013.01)

(58) Field of Classification Search
USPC .......................................................... 74/335
See application file for complete search history.

(56) References Cited

U.S. PATENT DOCUMENTS

| | | | |
|---|---|---|---|
| 2004/0140711 A1 | 7/2004 | Romeo | |
| 2010/0253494 A1* | 10/2010 | Inoue | G02B 27/01 340/436 |
| 2011/0246156 A1* | 10/2011 | Zecha | G06V 40/23 703/6 |
| 2012/0016627 A1* | 1/2012 | Nagura | G08G 1/161 702/150 |
| 2012/0287276 A1* | 11/2012 | Dwivedi | G06V 20/584 348/148 |
| 2013/0267367 A1 | 10/2013 | Kaltenbach et al. | |
| 2014/0309881 A1* | 10/2014 | Fung | B60W 50/087 701/36 |
| 2016/0176280 A1 | 6/2016 | Kaltenbach et al. | |
| 2019/0077246 A1 | 3/2019 | Preuss et al. | |

FOREIGN PATENT DOCUMENTS

| | | |
|---|---|---|
| DE | 102011087774 A1 | 6/2013 |
| DE | 102013215114 A1 | 2/2015 |
| DE | 102015226251 A1 | 6/2017 |
| DE | 102016202265 A1 | 8/2017 |
| DE | 102016205131 A1 | 10/2017 |
| EP | 2829773 A2 | 1/2015 |

OTHER PUBLICATIONS

German Search Report DE102017220392.7, dated Jun. 12, 2018. (14 pages).

* cited by examiner

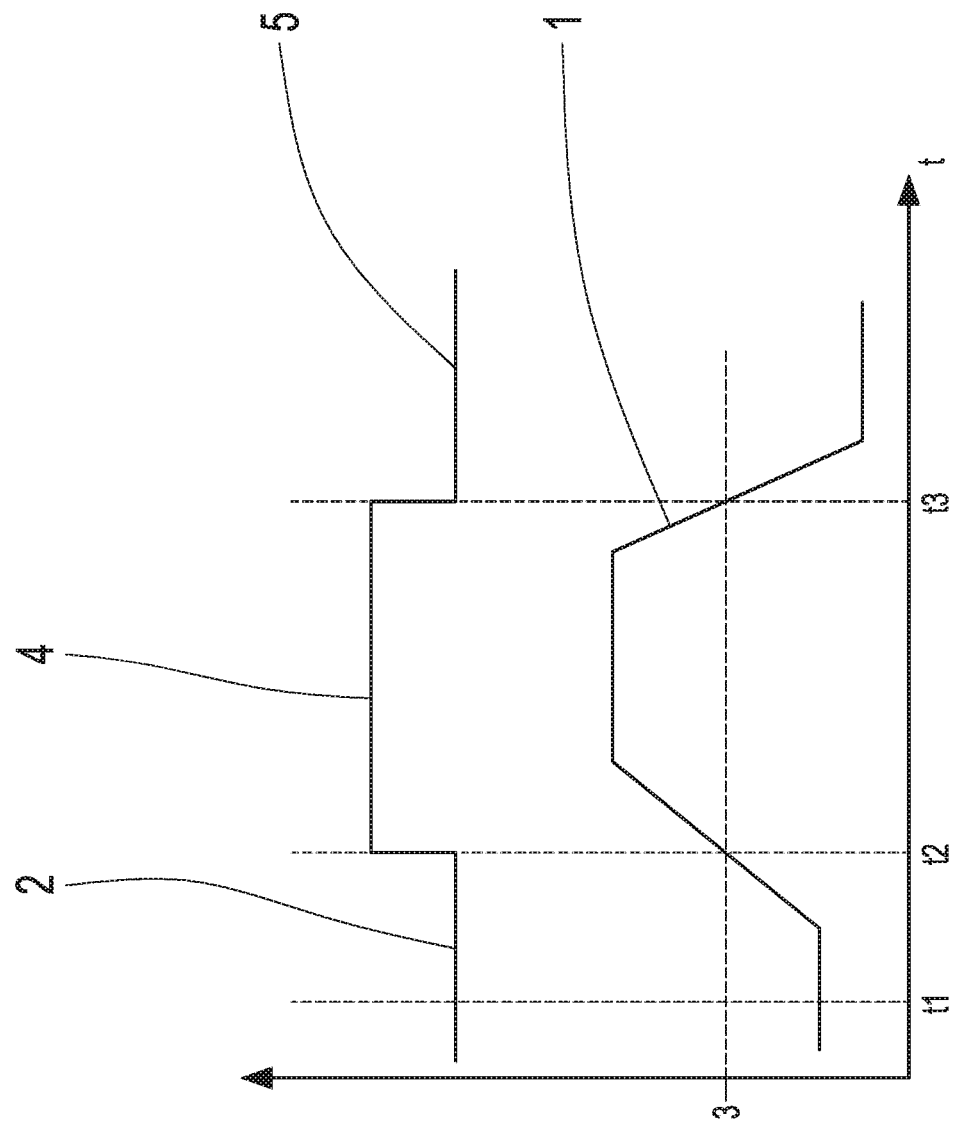

METHOD FOR OPERATING A HYBRID TRANSMISSION

CROSS-REFERENCE TO RELATED APPLICATION

The present application is related and has right of priority to German Patent Application No. 10 2017 220 392.7 filed on Nov. 15, 2017 and to PCT International Publication No. WO2019/096519, both of which are incorporated by reference in their entirety for all purposes.

FIELD OF THE INVENTION

The invention relates generally to a method for operating a hybrid transmission. The invention also relates generally to a hybrid transmission, which is designed for implementing the method.

BACKGROUND

A plurality of methods for operating hybrid transmissions is known from the prior art. The known hybrid transmissions can include a powershift transmission and an electric machine drivingly connected to the powershift transmission. Powershift transmissions are known, in the case of which the power flow in the engaged gear is transmitted in a purely form-locking manner. The gears can be shifted while at least partially maintaining the tractive force by utilizing the electric machine. Two gear change methods are known in this regard, namely an output-assisted gear shift and an electrodynamic gear shift.

A hybrid transmission, with respect to which an output-assisted gear shift and/or an electrodynamic gear shift can be carried out, is known from DE 10 2013 215 114 A1. With respect to the transmission represented in FIG. 1 of DE 10 2013 215 114 A1, an electrodynamic gear shift takes place when the shift element "K" is engaged and the shift elements "L" and "M" are disengaged. In an output-assisted gear shift, the shift elements "L" and "M" are engaged and the remaining shift elements are disengaged.

In addition, a hybrid transmission is known from DE 10 2010 063 582 A1, with respect to which an output-assisted gear shift and/or an electrodynamic gear shift can be carried out. With respect to the hybrid transmission shown in FIG. 1 of DE 10 2010 063 582 A1, in an electrodynamic gear shift, the shift element "A" is engaged and the remaining gears are disengaged. In the output-assisted gear shift, the shift element "B" is engaged and one of the gears 2, 4, 6 is engaged and a target gear 1, 3, 5, 7 is possible.

One disadvantage with respect to the hybrid transmissions known from the prior art is that, in cases in which a strong deceleration occurs in the drive train, the problem can occur that the gears can no longer be shifted. This problem results because the affected form-locking shift elements can no longer be relieved of load. As a result, the internal combustion engine can become stalled and/or the motor vehicle remains at a standstill with a seized drive train, because no clutch is present, with the aid of which the internal combustion engine can be disengaged from the power flow.

SUMMARY OF THE INVENTION

An example problem addressed by the invention is therefore that of providing a method for operating a hybrid transmission, in which a gear change is possible at any time, and in which the further aforementioned disadvantages do not occur.

The example problem is solved by a method, which is characterized in that the surroundings of a motor vehicle are monitored and, based on the data ascertained within the scope of the monitoring, a probability of occurrence of a driving situation to be anticipated is determined, which, upon occurring, results in a deceleration of the motor vehicle and, based on the determined probability of occurrence, it is decided whether to carry out an electrodynamic gear shift or an output-assisted gear shift in order to transfer the hybrid transmission out of an operating condition, in which a gear is engaged, into a shift condition.

The method according to example aspects of the invention has the advantage that critical driving situations are detectable, for example, by a control unit, in advance, i.e., before the occurrence of the driving situation and/or before a detection of the critical driving situation by a motor vehicle driver and, therefore, a changeover of the operating condition of the hybrid transmission into the shift condition can be proactively initiated by the transmission control unit. Therefore, a stalling of a motor vehicle drive unit, such as an internal combustion engine, is preventable in an easy way. In addition, it is ensured that the motor vehicle does not come to a standstill with a seized drive train and/or that the drive train is not loaded due to unfavorable operating conditions. The switch into the shift condition and/or the operation of the hybrid transmission in the shift condition can take place so quietly that the motor vehicle driver does not realize that the hybrid transmission is in the shift condition.

In the operating condition, a gear is engaged, which is specified according to a predefined operating strategy of the hybrid transmission. In the case of the output-assisted gear shift, an electric machine is drivingly connected, with a fixed ratio, to an output shaft of the hybrid transmission and supports the tractive force solely with the aid of the electric motor, while the motor vehicle drive unit carries out a load-free gear shift in the background. In the case of the electrodynamic gear shift, the coupled electric machine and/or the coupled motor vehicle drive unit are/is controlled for the gear shift by way of an open-loop system, at least temporarily, in such a way that a shift element to be actuated for carrying out the gear shift becomes load-free.

In the shift condition, the gear shift initiated via the electrodynamic gear shift or the output-assisted gear shift has not yet been concluded. This means, in the shift condition, the gear engaged during the operating condition is disengaged and another (e.g., subsequent) gear has not yet been engaged. In the shift condition, the drive of the motor vehicle takes place solely with the aid of the electric machine or with the aid of the electric machine and the motor vehicle drive unit. Whether the gear shift takes place with the aid of the electrodynamic gear shift or the output-assisted gear shift depends on the configuration of the hybrid transmission. In particular, the method according to example aspects of the invention can be utilized in the case of hybrid transmissions of a planetary design as well as of a countershaft design.

The motor vehicle can include a plurality of means for monitoring the surroundings of the motor vehicle. The surroundings of the motor vehicle are monitorable, for example, with the aid of a radar unit, a LIDAR unit, or with the aid of ultrasonic sensors. In addition, within the scope of the surroundings monitoring, data stored in a memory of the motor vehicle can be accessed. This is suitable for the case in which, for example, route data, such as information regarding the road course, are needed, which cannot be ascertained with the aid of the sensors present in the motor vehicle.

Within the scope of the surroundings monitoring, a distance value to another motor vehicle or another object is determinable. Preferably, the distance values are determinable with the aid of distance sensors. In addition, the actual position of the motor vehicle is determinable within the scope of the surroundings monitoring. The determination of the actual position of the motor vehicle can take place with the aid of a position determination system. In particular, the actual position is determinable with the aid of the GPS. In addition, pieces of geographic information are determinable within the scope of the surroundings monitoring. The pieces of geographic information are determinable from road maps stored in the memory of the motor vehicle. The pieces of geographic information can contain information regarding the course of the roadway, the slope, etc.

The driving situation to be anticipated can be any driving situation that results in a deceleration of the motor vehicle upon occurrence of the driving situation. A few exemplary driving situations are mentioned in the following, upon the occurrence of which a deceleration of the motor vehicle is necessary.

A deceleration of the motor vehicle is necessary when the distance to a preceding or leading motor vehicle and/or to an object is too short and, therefore, a full application of the brakes or a strong application of the brakes will become necessary. In the method according to example aspects of the invention, it is determined how high or great is the probability of occurrence that this critical condition occurs. The probability of occurrence can be that much higher or greater, the shorter is the distance to the preceding vehicle and/or to the object.

Alternatively or additionally, a deceleration of the motor vehicle can result and/or become necessary due to the road course. For example, the ground speed of the motor vehicle can be too high for driving through a curve and/or a roundabout. Therefore, the ground speed of the motor vehicle must be reduced in order to drive through the curve and/or the roundabout. In the method according to example aspects of the invention, it is determined how high or great is the probability of occurrence that the motor vehicle actually drives through the curve and/or the roundabout. The probability of occurrence can be that much higher or greater, the shorter is the distance to the curve and/or the roundabout.

The motor vehicle also decelerates when the roadway ascends. In the method according to example aspects of the invention, therefore, the probability of occurrence regarding whether the motor vehicle will drive along the ascending roadway is determined. The probability of occurrence is that much higher or greater, the shorter is the distance to the ascending roadway. In addition, the motor vehicle can be decelerated or stopped when merging into another lane if it is not possible to merge. In the method according to example aspects of the invention, it is determined how high or great is the probability of occurrence that a deceleration of the motor vehicle occurs during merging.

A deceleration of the motor vehicle will also take place when off-road driving takes place, which is associated with a high tractional resistance. This is problematic for the case in which the current tractional resistance is already high, because, in this case, a downshift will be difficult during off-road driving. This results because the shift elements of the hybrid transmission are already heavily loaded due to the high traction demand and a disengagement of the shift elements could bring the vehicle to a standstill. In the method according to example aspects of the invention, it is possible to determine the probability of occurrence that off-road driving will take place. The probability of occurrence is that much higher or greater, the shorter is the distance of the motor vehicle to the terrain and/or when the vehicle leaves the roadway.

In one particular example embodiment, the hybrid transmission is switchable into the shift condition when the probability of occurrence of the driving situation to be anticipated is equal to or greater than a threshold value. The threshold value can be predefined and/or stored in the memory of the motor vehicle. By comparison, the hybrid transmission is not switched into the shift condition when the probability of occurrence of the driving situation to be anticipated is less than the threshold value. This means, before the driving situation occurs, it is decided, for example, by a control unit of the transmission or of the motor vehicle, whether to switch the hybrid transmission into the shift condition.

The threshold value can be selected in such a way that the switching of the hybrid transmission into the shift condition takes place, for example, before the activation of an emergency braking system present in the motor vehicle. Alternatively or additionally, the threshold value can depend on a brake pressure and the switching of the hybrid transmission into the shift condition take place when the brake pressure has exceeded a certain value.

With respect to the shift condition, an output shaft of the hybrid transmission can be driven or drivable solely with the aid of the electric machine or, alternatively, with the aid of the electric machine and the motor vehicle drive unit. In particular, with respect to the output-assisted gear shift, the output shaft can be driven or drivable solely with the aid of the electric machine. Therefore, in the shift condition, a driving of the motor vehicle is possible solely with the aid of the electric machine, even when no gear is engaged. By comparison, in the case of the electrodynamic gear shift, the output shaft can be driven or drivable with the aid of the motor vehicle drive unit, such as the internal combustion engine, and the electric machine. Therefore, in the shift condition, a driving of the motor vehicle is possible solely with the aid of the electric machine and the motor vehicle drive unit, even when no gear is engaged.

The switching of the hybrid transmission into the shift condition can be carried out without an interruption of tractive force in the hybrid transmission. In addition, the switch can be carried out before the driving situation occurs.

In one particular example embodiment, the hybrid transmission is transferable from the shift condition into another operating condition, in which a gear is engaged. The hybrid transmission is transferable into the other operating condition when the probability of occurrence is less than the threshold value.

In one particular example embodiment, after a predefined time period, the aforementioned steps can be repeated, namely monitoring the surroundings of a motor vehicle and, based on the data ascertained within the scope of the monitoring, determining a probability of occurrence of a driving situation to be anticipated, which, upon occurring, results in a deceleration of the motor vehicle. In addition, a check can be carried out to determine whether the ascertained probability of occurrence of the driving situation to be anticipated is greater than or less than the threshold value. As a result, a check can be carried out several times, in an easy way, to determine whether a transfer of the hybrid transmission from the operating condition into the shift condition and/or from the shift condition into the other operating condition is to take place. After the transfer of the hybrid transmission into the other operating condition, the gear shift initiated with the aid of the electrodynamic gear shift or the output-assisted gear shift is finished.

The gear engaged during the other operating condition can be the same as the gear engaged during the operating condition. This can be the case if the motor vehicle was not decelerated, even if the probability of occurrence was briefly greater than the threshold value. In addition, the gear engaged during the other operating condition can be lower than the gear engaged during the operating condition. In this case, a deceleration of the motor vehicle takes place. The gear engaged during the other operating condition can be one or multiple gear steps lower than the gear engaged during the operating condition, depending on the deceleration of the motor vehicle.

The hybrid transmission can include a powershift transmission and the electric machine drivingly connected to the powershift transmission. In the case of the powershift transmission, the power flow in the engaged gear is transmittable in a purely form-locking manner In the process, an input shaft of the powershift transmission is drivingly connectable to the motor vehicle drive unit that does not belong to the hybrid transmission. In particular, an input shaft of the motor vehicle drive unit is rotationally fixable to the input shaft of the hybrid transmission. Therefore, no clutch is drivingly arranged between the hybrid transmission and the motor vehicle drive unit. The electric machine, in particular a rotor shaft of the electric machine, can always be drivingly connected to a transmission shaft that differs from the input shaft.

The powershift transmission can be an automatic transmission. The powershift transmission can include multiple other gear sets and/or multiple shift elements, with the aid of which different gears having different ratios are implementable between the input shaft and an output shaft of the powershift transmission. The input shaft can be drivingly connected or drivingly connectable to the other gear sets. In addition, the different gears are implementable by engaging a shift element or multiple other shift elements. When a gear is engaged, a driving of the motor vehicle is possible solely with the aid of the motor vehicle drive unit, in particular the internal combustion engine. Therefore, in order to implement the gear, the appropriate shift element or the appropriate shift elements is/are engaged, so that a drive is possible solely with the aid of the motor vehicle drive unit. The shift elements, in particular all shift elements necessary for the implementation of the gears, can be designed as form-locking shift elements.

Of particular advantage is a motor vehicle including a hybrid transmission according to example aspects of the invention. The motor vehicle includes the motor vehicle drive unit, which is drivingly connected to the hybrid transmission.

BRIEF DESCRIPTION OF THE DRAWINGS

In the figures, the method according to example aspects of the invention is diagrammatically represented and is described in the following with reference to the figures. Wherein:

FIG. 2 shows a switching of the hybrid transmission depending on the probability of occurrence of a driving situation to be anticipated.

DETAILED DESCRIPTION

Figure 1:
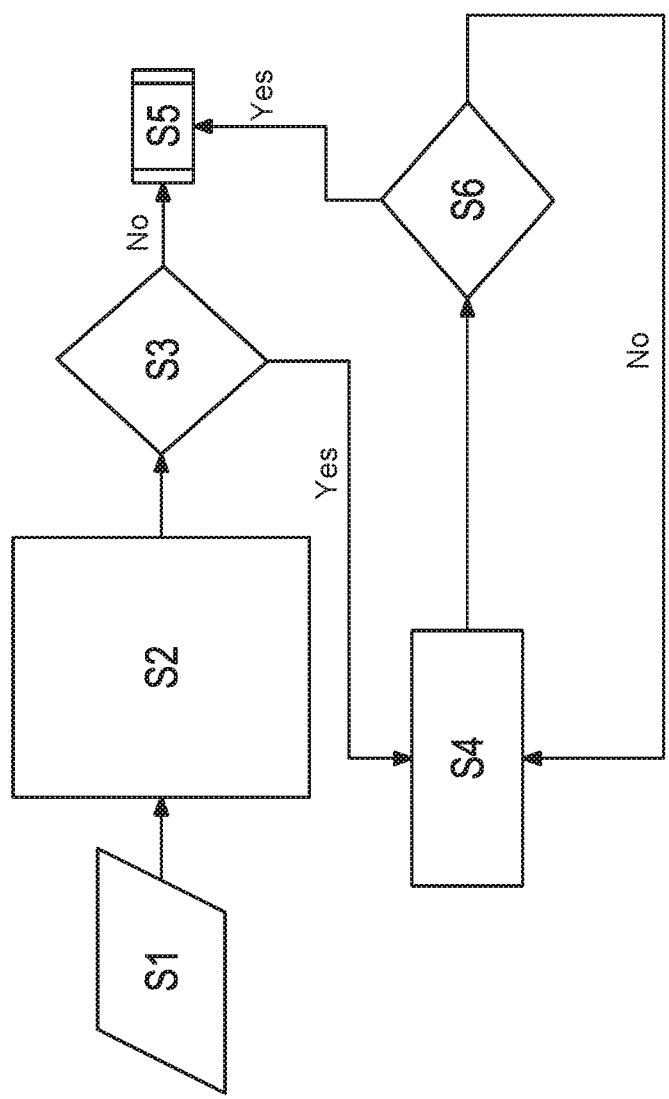
FIG. 1 shows a sequence of the method according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows the sequence of the method according to example aspects of the invention. In a first method step S1, the surroundings of a motor vehicle are monitored and, within the scope of the surroundings monitoring, data are ascertained. In particular, the actual position of the motor vehicle and/or the distance of the motor vehicle to a preceding or leading vehicle are/is detected. In addition, pieces of geographic information can be determined from a road map, which is stored in a memory of the motor vehicle. Pieces of geographic information in a defined area around the determined actual position of the motor vehicle can be read out of the memory. The pieces of geographic information can contain specific information regarding the roadway, such as information regarding the slope of the roadway, the course, etc.

Thereafter, in a second method step S2, the probability of occurrence of a driving situation to be anticipated is determined based on the ascertained data. The driving situation to be anticipated is a driving situation, upon the occurrence of which the motor vehicle is decelerated. The deceleration can result, for example, due to the fact that the vehicle is decelerated and/or the ground speed decreases due to a steeper roadway. The probability of occurrence is calculatable in a control unit based on the ascertained data. The probability of occurrence can be, for example, that much higher or greater, the shorter is the distance of the motor vehicle to the preceding or leading vehicle and/or the shorter is the path to a tight curve and/or a roundabout. The probability of occurrence is calculated before the driving situation to be anticipated occurs.

In a subsequent third method step S3, a check is carried out to determine whether the probability of occurrence of the driving situation to be anticipated is greater than a predefined threshold value, which, in particular, is stored in a memory. If this is the case, then, in a subsequent fourth method step S4, a transfer of the hybrid transmission out of an operating condition, in which a gear is engaged, into a shift condition takes place. In order to transfer the hybrid transmission, an electrodynamic gear shift or an output-assisted gear shift is carried out. In particular, in the fourth method step S4, within the scope of the electrodynamic gear shift or the output-assisted gear shift, the gear is disengaged and the motor vehicle is driven, without engaging a new gear, with the aid of the electric machine or with the aid of the electric machine and the motor vehicle drive unit.

If it is determined, however, in the third method step S3 that the probability of occurrence of the driving situation to be anticipated is less than the predefined threshold value, a gear shift does not take place and, in a fifth method step S5, the hybrid transmission is operated in the operating condition in which the gear is engaged.

Starting from the fourth method step S4, after a predefined time period, a check is carried out again, in a sixth method step S6, to determine whether the probability of occurrence has dropped below the threshold value. In order to check the probability of occurrence, the data mentioned in the method step S1 can be ascertained again. If the probability of occurrence has dropped below the threshold value, then, in the fifth method step S5, the hybrid transmission is transferred from the shift condition into another operating condition. In particular, during the transfer into the other operating condition, a gear is engaged, which can be lower than the gear of the operating condition. Alternatively, the gear of the other operating condition can also be identical to the gear of the operating condition.

If the probability of occurrence would still be higher than the threshold value, the hybrid transmission is not transferred from the shift condition into the other operating condition. This means, the motor vehicle continues to be driven either only with the aid of the electric machine or with the aid of the electric machine and the motor vehicle drive unit, without a gear being engaged. The sixth method step S6 can be carried out again after a predefined time period.

FIG. 2 shows a switching of the hybrid transmission depending on the probability of occurrence 1 of a driving situation to be anticipated. The condition in which the hybrid transmission is in is represented with the curve in the upper part of FIG. 2. Represented in the lower part is the curve of the probability of occurrence 1 of a driving situation to be anticipated, as a function of the time t.

At a first point in time t1, the probability of occurrence 1 of the driving situation to be anticipated is determined. The determined probability of occurrence 1 is less than the threshold value 3. Therefore, as is apparent from the upper part of FIG. 2, the hybrid transmission is not transferred from an operating condition 2 into a shift condition 4 at the first point in time t1. A gear is engaged in the operating condition 2.

At the second point in time t2, the probability of occurrence of the driving situation 1 to be anticipated is determined again. It is established that, at the point in time t2, the probability of occurrence for the driving situation to be anticipated is equal to or greater than the threshold value 3. Therefore, an output-assisted gear shift or an electrodynamic gear shift is carried out in order to transfer the hybrid transmission from the operating condition 2 into the shift condition 4. In the shift condition 4, no gear is engaged and the drive of the motor vehicle takes place exclusively with the aid of the electric machine or with the aid of the electric machine and the motor vehicle drive unit.

Starting at the point in time t3, the probability of occurrence for the driving situation to be anticipated drops below the threshold value 3, so that the hybrid transmission is transferred from the shift condition 4 into another operating condition 5, in which a gear is engaged. Due to the transfer of the hybrid transmission into the other operating condition 5, the output-assisted gear shift or the electrodynamic gear shift is concluded. In the other operating condition 5, a gear is engaged, which can be lower than the gear engaged during the operating condition 2.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS

1 Curve of the probability of occurrence
2 operating condition
3 threshold value
4 shift condition
S1 first method step
S2 second method step
S3 third method step
S4 fourth method step
S5 fifth method step
S6 sixth method step
t time
t1 first point in time
t2 second point in time

The invention claimed is:
1. A method for operating a hybrid transmission, comprising:
  monitoring surroundings of a motor vehicle;
  based on data ascertained during the monitoring, determining a probability of occurrence of an anticipated driving situation, the anticipated driving situation resulting in a deceleration of the motor vehicle upon occurring of the anticipated driving situation; and
  based on the determined probability of occurrence, deciding whether to carry out an electrodynamic gear shift or an output-assisted gear shift in order to transfer the hybrid transmission out of an operating condition into a shift condition, a gear of the hybrid transmission engaged in the operating condition, the gear of the hybrid transmission disengaged in the shift condition.

2. The method of claim 1, wherein monitoring the surroundings of the motor vehicle comprises one or more of:
  determining a distance value to another vehicle or to another object;
  determining an actual position of the motor vehicle; and
  ascertaining at least one piece of geographic information.

3. The method of claim 1, further comprising:
  switching the hybrid transmission into the shift condition when the determined probability of occurrence is equal to or greater than a threshold value; or
  not switching the hybrid transmission into the shift condition when the determined probability of occurrence is less than the threshold value.

4. A hybrid transmission, configured to implement the method of claim 1.

5. The hybrid transmission of claim 4, comprising:
  a powershift transmission; and
  an electric machine drivingly connected to the powershift transmission.

6. A method for operating a hybrid transmission, comprising:
  monitoring surroundings of a motor vehicle;
  based on data ascertained during the monitoring, determining a probability of occurrence of an anticipated driving situation, the anticipated driving situation resulting in a deceleration of the motor vehicle upon occurring of the anticipated driving situation; and
  based on the determined probability of occurrence, deciding whether to carry out an electrodynamic gear shift or an output-assisted gear shift in order to transfer the hybrid transmission out of an operating condition into a shift condition, a gear of the hybrid transmission engaged in the operating condition,
wherein one or more of
in the shift condition, an output shaft of the hybrid transmission is driven or drivable solely with an electric machine or with a motor vehicle drive unit,
the transfer of the hybrid transmission into the shift condition is carried out before the anticipated driving situation,
the transfer of the hybrid transmission into the shift condition is carried out without interrupting tractive force, and
no gear of the hybrid transmission is engaged in the shift condition.

7. The method of claim 6, wherein monitoring the surroundings of the motor vehicle comprises one or more of:
determining a distance value to another vehicle or to another object;
determining an actual position of the motor vehicle; and
ascertaining at least one piece of geographic information.

8. The method of claim 6, further comprising:
switching the hybrid transmission into the shift condition when the determined probability of occurrence is equal to or greater than a threshold value; or
not switching the hybrid transmission into the shift condition when the determined probability of occurrence is less than the threshold value.

9. A hybrid transmission, configured to implement the method of claim 6.

10. A method for operating a hybrid transmission, comprising:
monitoring surroundings of a motor vehicle;
based on data ascertained during the monitoring, determining a probability of occurrence of an anticipated driving situation, the anticipated driving situation resulting in a deceleration of the motor vehicle upon occurring of the anticipated driving situation;
based on the determined probability of occurrence, deciding whether to carry out an electrodynamic gear shift or an output-assisted gear shift in order to transfer the hybrid transmission out of an operating condition into a shift condition, a gear of the hybrid transmission engaged in the operating condition; and
transferring the hybrid transmission from the shift condition into another operating condition when the determined probability of occurrence is less than a threshold value, the gear or another gear of the hybrid transmission engaged in the another operating condition.

11. The method of claim 10, wherein monitoring the surroundings of the motor vehicle comprises one or more of:
determining a distance value to another vehicle or to another object;
determining an actual position of the motor vehicle; and
ascertaining at least one piece of geographic information.

12. The method of claim 10, further comprising:
switching the hybrid transmission into the shift condition when the determined probability of occurrence is equal to or greater than a threshold value; or
not switching the hybrid transmission into the shift condition when the determined probability of occurrence is less than the threshold value.

13. A hybrid transmission, configured to implement the method of claim 10.

14. A method for operating a hybrid transmission, comprising:
monitoring surroundings of a motor vehicle;
based on data ascertained during the monitoring, determining a probability of occurrence of an anticipated driving situation, the anticipated driving situation resulting in a deceleration of the motor vehicle upon occurring of the anticipated driving situation;
based on the determined probability of occurrence, deciding whether to carry out an electrodynamic gear shift or an output-assisted gear shift in order to transfer the hybrid transmission out of an operating condition into a shift condition, a gear of the hybrid transmission engaged in the operating condition;
repeating the monitoring surroundings of the motor vehicle and the determining the probability of occurrence of the anticipated driving situation after a predefined time period; and
carrying out a check to determine whether an additional determined probability of occurrence is greater than or less than a threshold value.

15. The method of claim 14, further comprising transferring the hybrid transmission from the shift condition into another operating condition when the additional determined probability of occurrence is less than the threshold value, the gear or another gear of the hybrid transmission engaged in the another operating condition, the another gear of the hybrid transmission being lower than the gear engaged during the operating condition.

16. The method of claim 14, wherein monitoring the surroundings of the motor vehicle comprises one or more of:
determining a distance value to another vehicle or to another object;
determining an actual position of the motor vehicle; and
ascertaining at least one piece of geographic information.

17. The method of claim 14, further comprising:
switching the hybrid transmission into the shift condition when the determined probability of occurrence is equal to or greater than a threshold value; or
not switching the hybrid transmission into the shift condition when the determined probability of occurrence is less than the threshold value.

18. A hybrid transmission, configured to implement the method of claim 14.

* * * * *